United States Patent [19]

Olson et al.

[11] Patent Number: 4,953,986
[45] Date of Patent: Sep. 4, 1990

[54] AIR/SEA TEMPERATURE PROBE

[75] Inventors: Jack R. Olson; Herbert V. Hitney, both of San Diego; Richard A. Paulus, La Mesa; Kenneth D. Anderson, Lemon Grove, all of Calif.

[73] Assignee: The United States of America as represented by the Secretary of the Navy, Washington, D.C.

[21] Appl. No.: 348,740

[22] Filed: Apr. 27, 1989

[51] Int. Cl.⁵ .................. G01K 13/00; G01K 1/14
[52] U.S. Cl. .................. 374/136; 73/170 A; 73/300; 374/135; 374/141
[58] Field of Search ............ 374/142, 143, 136, 137, 374/144, 135; 73/170 A, 204.25, 300

[56] References Cited

U.S. PATENT DOCUMENTS

| | | |
|---|---|---|
| 1,257,568 | 2/1918 | Wilson .................. 73/204.25 |
| 2,316,942 | 4/1943 | Doll .................... 374/136 |
| 2,959,958 | 11/1960 | Savet ................. 374/135 X |
| 2,970,475 | 2/1961 | Werner ............... 374/135 X |
| 3,561,267 | 2/1971 | Costello ............... 374/136 |
| 4,044,611 | 8/1977 | Kaname et al. ........ 73/170 A |
| 4,112,753 | 9/1978 | Call ..................... 73/170 R |
| 4,129,848 | 12/1978 | Frank et al. ......... 374/185 X |
| 4,348,870 | 9/1982 | Stein et al. .......... 374/165 X |
| 4,382,246 | 5/1983 | Hansson et al. ...... 374/185 X |
| 4,427,293 | 1/1984 | Harmer ................ 356/136 |
| 4,557,608 | 12/1985 | Carver ................. 73/300 X |
| 4,676,664 | 6/1987 | Anderson et al. .... 374/136 |
| 4,749,254 | 6/1988 | Seaver ............... 374/143 X |
| 4,854,728 | 8/1989 | Baron et al. .......... 374/136 |

OTHER PUBLICATIONS

"Sippican Expendable Profiling Systems", Sippican Xbt,XSV, 11/1985, 4 pp. (Sales Brochure).

Primary Examiner—Daniel M. Yasich
Attorney, Agent, or Firm—Harvey Fendelman; Thomas Glenn Keough; Michael A. Kagan

[57] ABSTRACT

An air/sea temperature probe is disclosed which can be deployed from a moving ship to detect the temperature profile of the atmosphere and ocean beyond the thermal influence of a ship. The probe includes a temperature transducer which utilizes a bifilar wire that provides a very quick air temperature time constant. The transducer is mounted within a radiation shield having low thermal conductance to minimize thermal and solar radiation contamination and is coupled to a signal processing network. In operation, the probe is deployed from a ship and provides temperature telemetry via an electrical data link coupled between the signal processing network and a receiving transducer located onboard the ship.

37 Claims, 5 Drawing Sheets

AIR/SEA TEMPERATURE PROBE,

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the field of temperature measuring instruments. Specifically, the present invention relates to the field of measuring air and ocean surface temperature profiles from a ship underway at sea and allows accurate discernment of the temperature difference between the air and ocean surface.

A surface evaporation duct generally exists at the interface of large bodies of water, such as the oceans, and the atmosphere. This duct can cause refraction of electromagnetic radiation propagated through it. Such refraction can seriously impact the effectiveness of radio communications, radars, and radio navigation transmissions because the transmissions may be refracted away from the path of their intended destination. Refraction could also provide false indications of the direction of propagation of transmissions which could result in inaccurate identification of the location of an aircraft or ship.

The refractive properties of the surface evaporation duct are dependent upon the air temperature and moisture profiles immediately adjacent the ocean surface. The ocean surface temperature can significantly affect the refractive properties of the surface evaporation duct. Therefore, the temperature difference between the air and ocean surface is an important factor which must be considered when attempting to predict the overall refractive properties of the surface evaporation duct.

Various types of instruments have been developed which can separately measuring either air or water temperature. U.S. Pat. No. 4,749,254, by Seaver, discloses an optical sensor system for measuring water temperature, index of refraction, and water pressure. The sensors and optical circuitry are contained within a torpedo shaped expendable probe vehicle. The temperature sensor is a selenium prism. The probe vehicle is deployed from a vessel into the ocean to begin a gravity induced free-fall which cause an optical fiber wave guide to unreel within the probe vehicle. The wave guide is operably coupled to a spectrograph recorder positioned on board the vessel. Values of temperature, pressure, and index of refraction are continuously recorded as the probe vehicle descends into the depths of the ocean.

Another type of instrument for measuring a water temperature profile is an expendable bathothermograph probe, such as manufactured by Sippican Ocean Systems, Inc., Marion, MA. This device contains a thermistor located in the nose of the probe. Changes in water temperature are recorded by changes in the resistance of the thermistor as the probe falls through the water. Resistance values are telemetered along two-conductor signal wire to a shipboard data processing system.

U.S. Pat. No. 4,044,611 by Kaname, et al. discloses an expendable oceanography probe for detecting ocean temperature profiles. This device includes a thermistor positioned at the forward end of the probe, an oscillating circuit, and an acoustical disc transducer for radiating a sound signal into the water corresponding to the detected temperature of the water. The resistance of the thermistor is functionally related to the water temperature. The resistance is detected by the oscillating circuit which outputs an electrical pulse signal having a period corresponding to the detected temperature. A piezoelectric ceramic transducer receives the pulse signal and resonates at an ultrasonic frequency corresponding to the water temperature. In the operation of this device, the probe is thrown into the sea from a moving ship and falls vertically through the water. The ultrasonic sound pulse signal which is radiated from the transducer of the probe is received by a receiving transducer installed onboard a ship below the water line.

A problem with all of the above devices is that none of them has a sufficiently low enough time constant to enable it to be deployed in a manner which would enable it to also measure an air temperature profile uninfluenced by thermal contamination of the ship from which it is deployed.

Ocean water temperature has also been measured by detecting the temperature of ocean water passing through the sea water intakes of shipboard power plant cooling systems. However, the temperatures detected by this method are also contaminated by the thermal influence of the ship. Furthermore, they do not accurately detect ocean surface water temperature because the sea water inlets may be at depths of up to 40 feet below the ocean surface.

Air temperature has typically been measured at sea on ships with hand-held thermometers or by remote air temperature sensing instruments typically mounted on a mast of the ship. However, this method is not accurate enough for detecting surface duct evaporation conditions because the detected temperatures are typically contaminated by the thermal influence of the ship.

Therefore, a need exists for a simple device which can measure air and ocean temperatures from a moving ship beyond the thermal influence of the ship so that the difference between the air temperature just above the ocean surface and the ocean surface temperature can be determined.

SUMMARY OF THE INVENTION

The present invention overcomes the shortcomings of the prior art by providing an inexpensive air/sea temperature probe which can detect air and ocean surface temperature beyond the thermal influence of a ship underway at sea. This is achieved because the invention has an extremely quick air temperature time constant of less than 100 milliseconds. The invention comprises a temperature transducer formed as bifilar wire looped several times around an electrically nonconductive open frame. The resistance of the wire corresponds to ambient temperature. A signal processing network detects the resistance of the wire and provides an electrical pulse modulated output functionally related to the resistance. The pulse modulated signal is provided to an opto-isolator which in turn propagates a second pulsed electrical signal that is propagated via electrical wires to a receiver located on the ship. The temperature transducer and electrical circuitry are mounted within a tubular shaped thermal radiation shield having low reflectivity and thermal conductance.

The invention is very simple to operate. The probe may be hand thrown or launched into a trajectory which carries it beyond the thermal influence of the ship. The time constant of the transducer is low enough so that by the time it reaches the apogee of its trajectory, it senses ambient air temperature. As the invention descends to the ocean surface, it constantly provides air temperature telemetry to the shipboard receiver. When the invention impacts the ocean surface, it then detects ocean near surface temperature.

OBJECTS OF THE INVENTION

An object of the present invention is to provide an instrument deployable from a moving ship which can measure air and ocean surface temperature beyond the thermal influence of the ship.

Another object of the present invention is to provide an instrument for measuring air and ocean surface temperatures which has a very low air temperature time constant.

A third object of the present invention is to provide an instrument which is hand launchable for measuring air and ocean surface water temperature beyond the thermal influence of a ship.

These and other objects, advantages, and novel features of the invention will become apparent from the following detailed description of the invention when considered in conjunction with the accompanying drawings.

DESCRIPTION OF THE PREFERRED EMBODIMENTS

Figure 1:
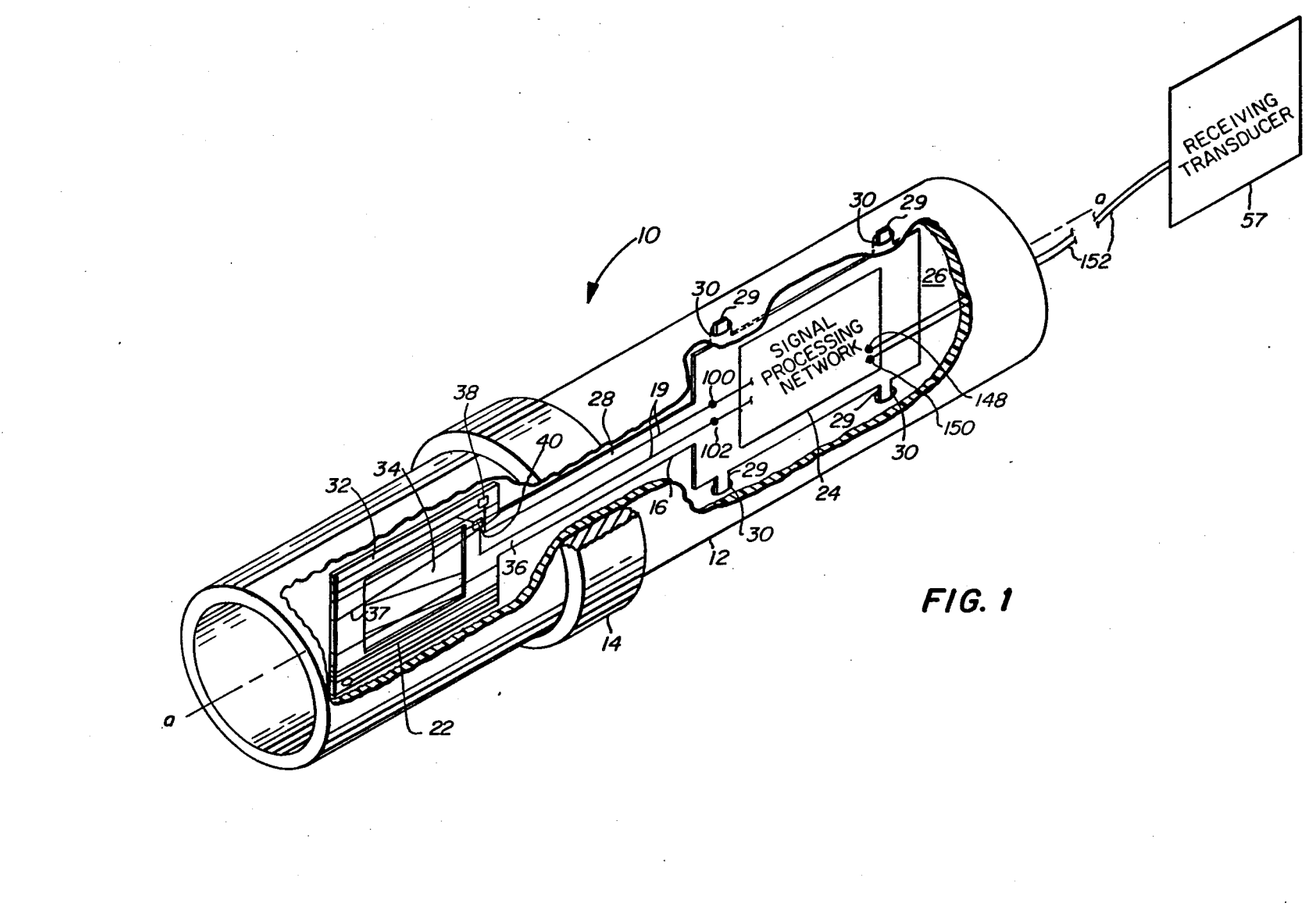
FIG. 1 is a cut-away, three-quarter view of the air/-sea temperature probe.

Referring to the drawings where like reference numerals designate like or similar parts throughout the several views, there is illustrated in FIG. 1 an air/sea temperature probe 10 comprising tubular solar radiation shield 12, weight 14 mounted towards the forward end of shield 12; support 16 mounted within shield 12; means for detecting temperature which may be implemented as transducer 22 mounted on the forward end of support 16; and means for providing an output functionally related to the detected temperature which may be implemented as signal processing network 24 mounted towards the aft end of support 16. These components are described more fully below.

Shield 12 is a tube constructed of electrically nonconducting material such as polymer or fiberglass. Shield 12 may have an outside diameter of approximately 4.5 cm and a wall thickness of around 1.3 mm. In the preferred embodiment, shield 12 is fabricated of polymeric material, selected because polymers are electrically nonconductive and have relatively low thermal conductivity of about 0.003 cal−cm/sec−cm$^2$−C°. Shield 12 is painted white to minimize solar radiation heat gain of transducer 22, although other highly reflective coatings may also be employed. The white coating provides shield 12 with a reflectivity of 0.7. The above dimensions and values of physical properties are given by way of example only. It is to be understood that the scope of the invention comprehends dimensions and values for physical properties other than those specifically recited herein.

Support 16 is constructed of a single piece of standard, commercially available circuit board having a shape which includes aft rectangular area 26 and coterminous elongated section 28 extending, by way of example, approximately 9.0 cm therefrom along axis a—a as shown in FIG. 1. Four tabs 29 extend from area 26 and are epoxied into holes 30 of shield 12 to fixedly mount support 16 therein such that axis a—a is substantially coincident with the longitudinal axis of shield 12. Rectangular frame 32 having a smaller rectangular area 34 removed therefrom extends coterminously from forward end 36 of elongated section 28. By way of example, the overall dimension of frame 32 is 5.0 cm in the direction parallel to axis a—a and 2.5 cm in the direction perpendicular to axis a—a. The cross-sectional area of area 28 minimizes conductive heat transfer between area 26 and frame 32.

Transducer 22 is constructed of bifilar insulated wire 37. The resistance of wire 37 is functionally related to ambient temperature. In the preferred embodiment, wire 37 is AWG No. 44 insulated bifilar alloy wire comprised of approximately 70 per cent nickel and 30 percent iron. The AWG No. 44 wire is commercially available from MWS Wire Industries, Westlake Village, CA as part number 44MWS120+SML. Wire 37 has a diameter of 0.0056 cm, a resistivity of 98.4 ohm/m at 20° C., and a temperature coefficient of 0.0045 ohm-/ohm−°C. Bifilar wire is preferable to single strand wire in order to minimize extraneous electromagnetic field induction into transducer 22. In the preferred embodiment, each loop of bifilar wire 37 has a pitch of approximately 1 mm and is wrapped sixteen times around frame 32, resulting in wire 37 having an overall length of 335 cm and a resistance of approximately 350 ohms at 35° C.

Figure 2:
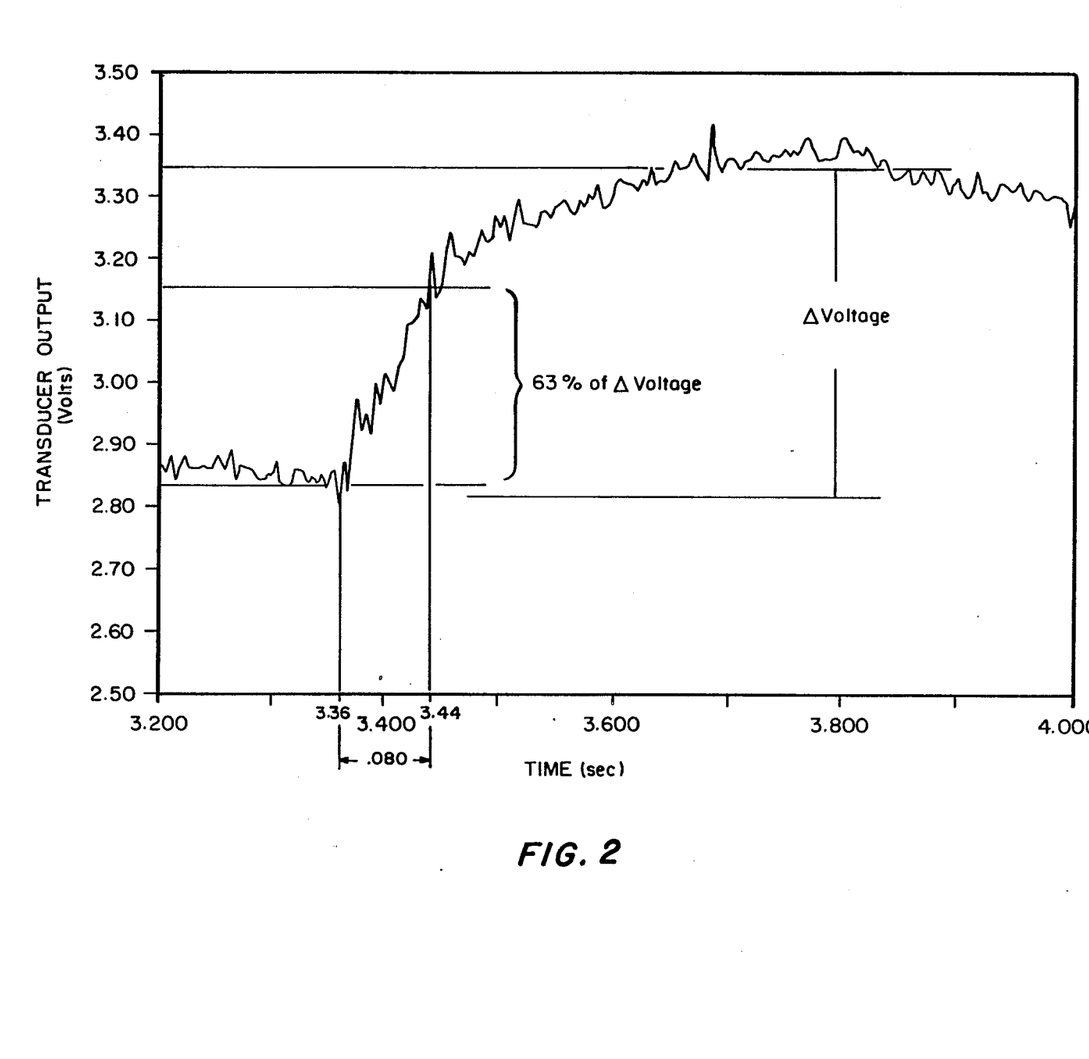
FIG. 2 is a graph illustrating the air temperature time response of the air/sea temperature probe.
Figure 3:
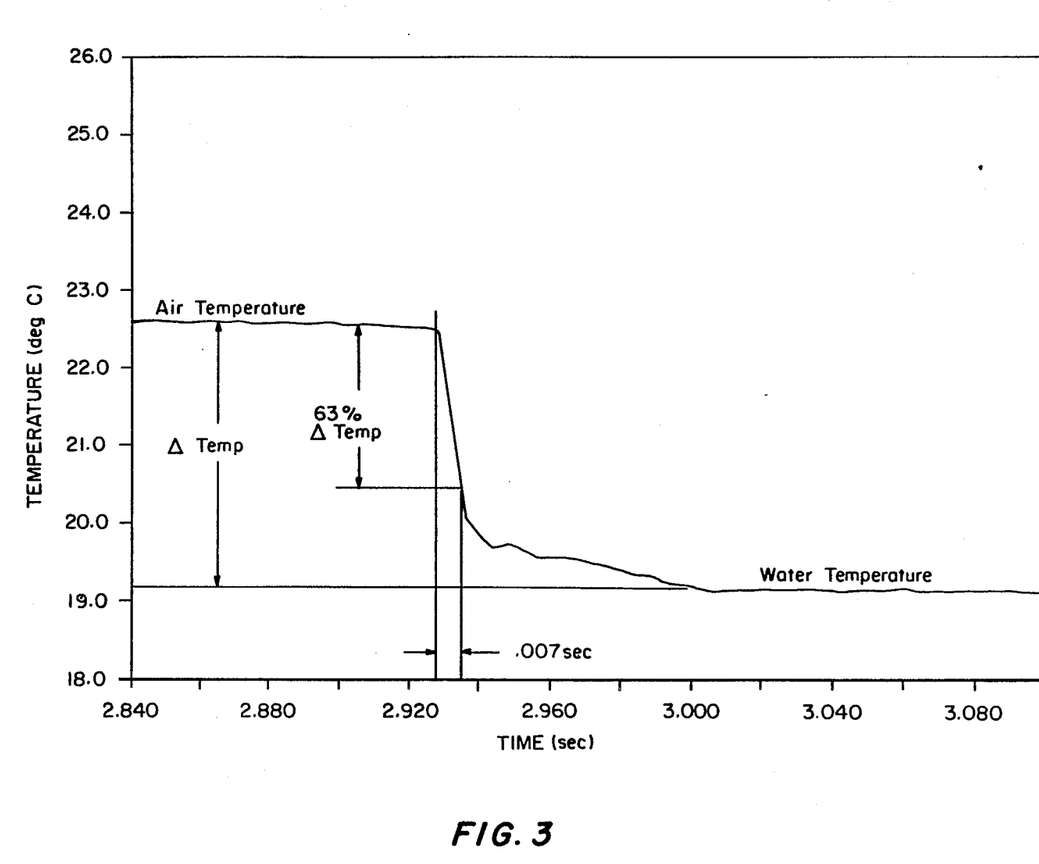
FIG. 3 is a graph illustrating the air-water temperature time response of the air/sea temperature probe.

This construction provides transducer 22 with an air temperature time constant of approximately 80 milliseconds as illustrated in FIG. 2 and a air-water temperature time constant of approximately 7 milliseconds as illustrated in FIG. 3. However, it is to be understood that the scope of the invention also includes an air/sea temperature probe having an air temperature time constant up to 500 milliseconds. An air temperature time constant is the time required for the resistance of wire 37 when immersed in air to correspond to 63 per cent of a step change in ambient air temperature. An air-water temperature time constant is the time required for the resistance of wire 37 to correspond to 63 per cent of a step change in temperature between air and water immersion.

It is to be understood that the specific properties and dimensions of wire 37, and details of construction of transducer 22 are provided by way of example only, and that scope of the construction of transducer 22 comprehends other types of temperature transducers known by those skilled in this technology to provide performance equivalent to that of transducer 22.

Figure 4:
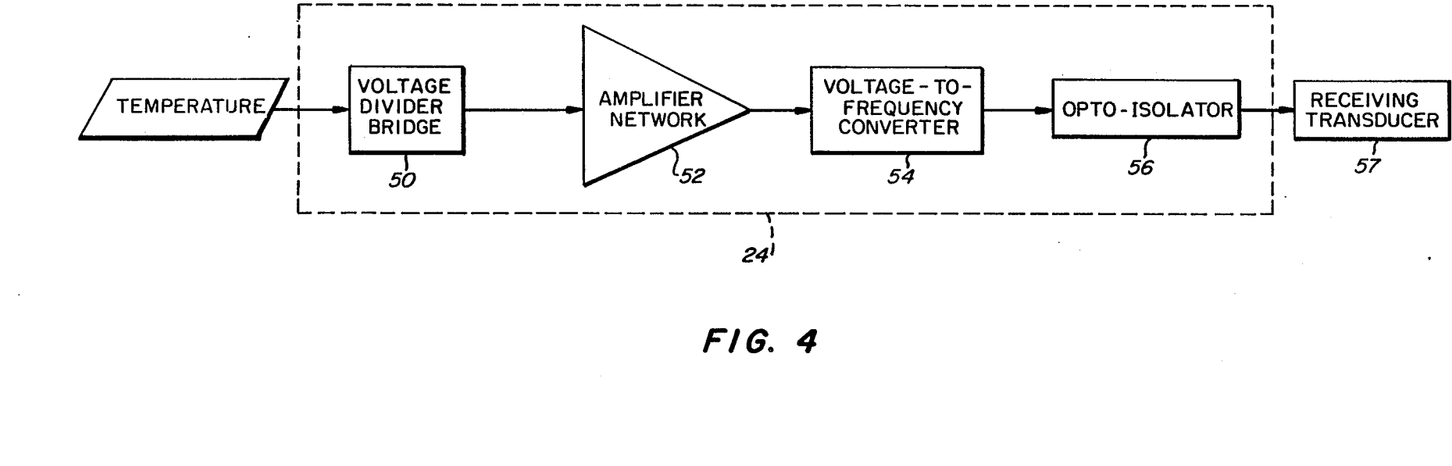
FIG. 4 is a block diagram of the signal processing network.
Figure 5:
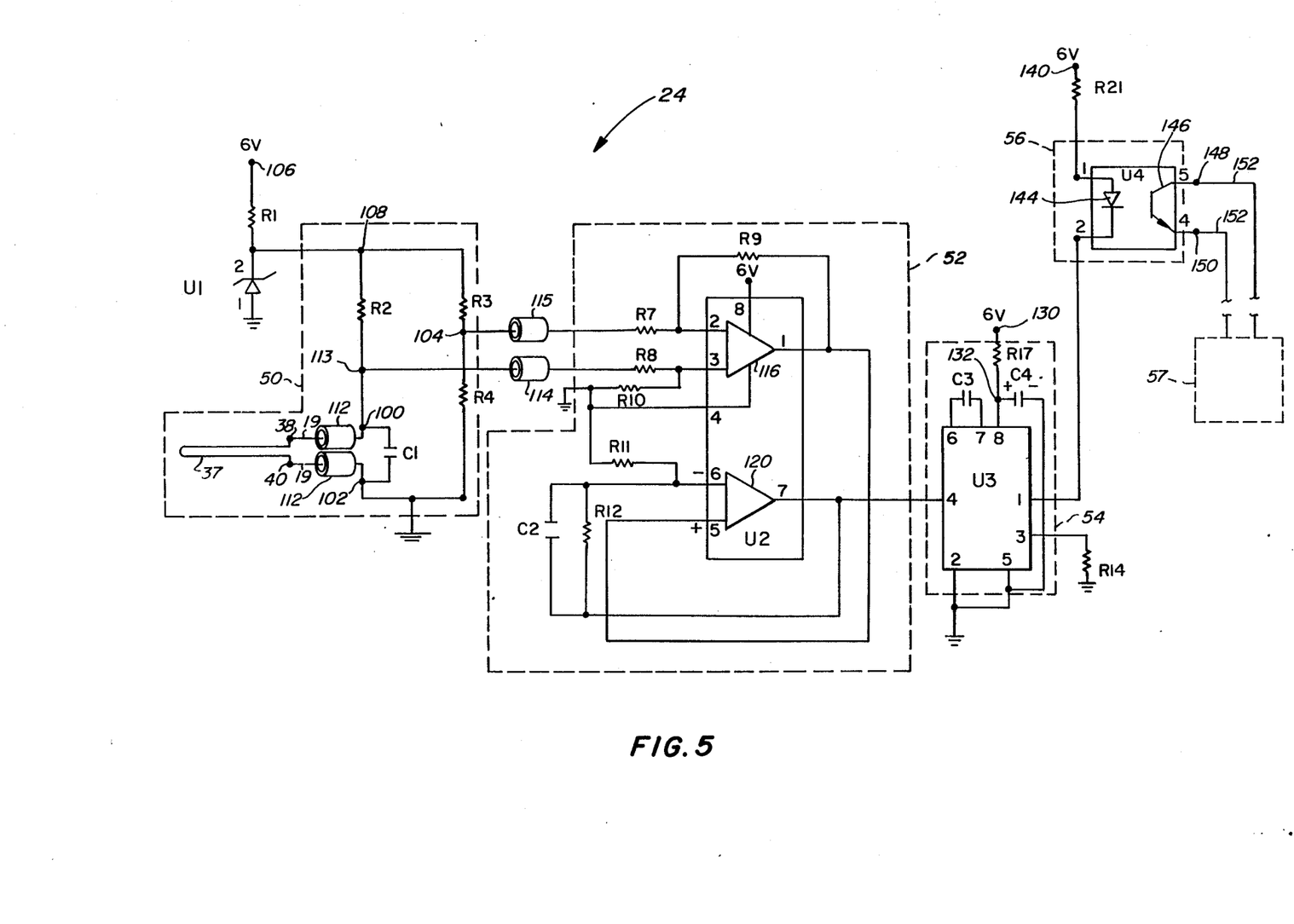
FIG. 5 is a schematic diagram of the signal processing network.

Signal processing network 24 is illustrated in block diagram format in FIG. 4 and in the preferred embodiment is mounted on area 26 of support 16 illustrated in FIG. 1. Voltage divider bridge 50, which includes transducer 22, provides a low voltage dc output proportional to the resistance of bifilar wire 37. The resistance of bifilar wire 37 is proportional to ambient temperature. Electrical conductors 19 connect each end of bifilar wire 37 to nodes 38 and 40 of bridge 50, as shown in FIG. 5, and may, for example, be etched on support 16 by techniques well known to those skilled in this technology. Amplifier network 52 receives the output of bridge 50 and amplifies it to a level sufficient to drive voltage-to-frequency converter 54. Voltage-to-frequency converter 54 provides a square wave, frequency modulated output having a frequency which is proportional to the low voltage dc input received from amplifier network 52. The frequency modulated output of voltage-to-frequency converter 54 is provided to opto-isolator 56 which in turn provides a pulsed output which is propagated via electrical conductors 152 to remote shipboard receiving transducer 57 which may, for example, be a printer, strip chart recorder, or data storage device.

The details of signal processing network 24 are shown in FIG. 5. Specifically, bridge 50 comprises electrical connectors 19, operably coupling the ends of bifilar wire loop 37 at nodes 38 and 40, to nodes 100 and 102, respectively. Resistors R1 and R2 are connected in series between voltage input node 106 and node 100. Resistors R3 and R4 are connected in series between resistors R1 and R2 at node 108, and node 102. Zener diode U1 is connected between resistors R1 and R2, and ground to provide a constant excitation voltage to resistors R2, R3, and R4.

Optional ferrite sleeves 112, one each operably coupled between nodes 38 and 100, and between nodes 40 and 102, were utilized to filter extraneous electromagnetic signals which could result in false temperature measurement. Optional capacitor C1 may be coupled across nodes 100 and 102 to filter extraneous electromagnetic radiation from affecting bridge 50 that could result in erroneous indications of detected temperature.

Amplifier network 52 may, for example, be implemented as microchip U2 comprising operational amplifiers 116 and 120. One output of bridge network 50 is provided from node 113 to the positive input of operational amplifier 116, specifically identified as pin connector 3. Resistor R8 is operably coupled between node 113 and pin connector 3 of operational amplifier 116. Optional ferrite sleeve 114 may be operably coupled between node 113 and pin connector 3 of operational amplifier 116. The other output of bridge network 50 is provided from node 104 to the negative input of operational amplifier 116, specifically identified as pin connector 2. Resistor R7 is operably coupled between node 104 and pin connector 2 of operational amplifier 116. Optional ferrite sleeve 115 may be operably coupled between node 104 and pin connector 2 of operational amplifier 116. The output of operational amplifier 116 is the unity gain of the voltage difference between nodes 113 and 104. Resistor R9 is operably coupled across pin connectors 2 and 1 of operational amplifier 116. Resistor R10 is connected between pin connector 3 of operational amplifier 116 and ground. Resistors R7, R8, R9, and R10 in conjunction with operational amplifier 116 provide a difference amplifier. Ferrite sleeves 114 and 115 prevent spurious electromagnetic radiation from affecting the output of operational amplifier 116.

The output of operational amplifier 116 is directed to the positive input of operational amplifier 120 at pin connector 5. Optional capacitor C2 is connected in parallel with resistor R12 across pin connectors 6 and 7 of operational amplifier 120. Capacitor C2 provides additional low-pass filtering of spurious electromagnetic radiation which could affect the output of operational amplifier 120. Resistor R11 is connected between pin connector 6 and ground. Resistors R11 and R12 establish the gain of operational amplifier 120.

It is to be understood that amplifier network 52 comprising operational amplifiers 116 and 120 may also be implemented with discrete components as would be readily understood by one skilled in this technology.

The output of operational amplifier 120 is provided to voltage-to-frequency converter 54 which may be implemented as microchip U3. Specifically, the output of operational amplifier 120 is directed to pin connector 4 of microchip U3. The output of voltage-to-frequency converter 54 is a frequency modulated square wave having a frequency which is functionally related to the resistance of bifilar wire 37. Capacitor C3 is connected between pin connectors 6 and 7 of microchip U3. Resistor R14 is coupled between pin connector 3 of microchip U3 and ground. Resistor R17 is connected in series between node 130 and pin connector 5 of microchip U3. Node 132, interposed between resistor R17 and capacitor C4, is operably connected to pin connector 8 of microchip U3. Capacitor C3 and resistor R14 provide an output having a frequency relationship to ambient temperature and resistance of bifilar wire 37 as set forth is Table 2 herein.

The output of voltage-to-frequency converter 54 is directed to opto-isolator 56 which may be implemented as microchip U4. Specifically, the output of voltage-to-frequency converter 54 is provided to pin connector 2 of microchip U4. Microchip U4 comprises photodiode 144 connected between connector pins 1 and 2 thereof and photocell 146 connected between pin connectors 4 and 5 thereof. Resistor R21, connected between node 140 and pin connector 1 of microchip U4, limits the current through photodiode 144.

In the preferred embodiment, by way of example only, microchips U1, U2, U3, and U4 are commercially available and identified in Table 1 below. However, it is to be understood that devices or electrical circuits equivalent to those identified in Table 1, as are well known, may also be used.

TABLE 1

| Microchip | Manufacturer | Type |
| --- | --- | --- |
| U1 | Linear Technology, Corp. | LT1004CZ-1.2 |
| U2 | Texas Instruments, Inc. | TLC25M2CP |
| U3 | Analog Devices, Inc. | AD654 |
| U4 | Texas Instruments, Inc. | TIL117 |

Signal processing network 24 is energized by application of six volts to nodes 106, 130, and 140, as well as to the power supply of operational amplifier 116, pin connector 8. By way of example, this voltage is provided by four silver oxide 1.5 Vdc batteries, such as Mallory Type D391B, not shown. The batteries are connected in series and mounted to support 16 by well known techniques. Values for resistors R4, R5, and R6 preferably are chosen so that the detected ambient temperature (air or water), the resistance of bifilar wire 37 and the output of signal processing network 24 correlate in accordance with Table 2 below:

TABLE 2

| Temperature (°C.) | Bifilar Resistance (Ohms) | Signal Processing Network Frequency Output (KHZ) |
| --- | --- | --- |
| −2.5 | 300 | 0 |

TABLE 2-continued

| Temperature (°C.) | Bifilar Resistance (Ohms) | Signal Processing Network Frequency Output (KHZ) |
|---|---|---|
| 35.0 | 350 | 10.0 |

Referring to FIG. 1, weight 14 is mounted to the exterior of shield 12 so that the center of gravity of probe 10 is towards the transducer end of probe 10. Lead bars, which by way of example may be 0.4 mm thick and have a mass of 0.5 kg, are wrapped around shield 12 and taped (not shown) to hold them in place.

In the operation of the invention, air/sea temperature probe 10 is deployed, as for example by hand, in an upward trajectory preferably from a windward location of moving ship at an angle of approximately 45 degrees from the horizontal. Deployment in this manner ensures that air/sea temperature probe 10 is carried in a trajectory beyond the thermal influence of the ship. Since the time response of transducer 22 is so quick, transducer 22 begins to detect ambient atmospheric temperature uninfluenced by any thermal contamination of the ship at about the time it reaches the apogee of its trajectory.

Transducer 22 detects temperature in response to the resistance of bifilar wire 37 which increases linearly as the ambient temperature increases. The ends of bifilar wire 37 are operably coupled to nodes 38 and 40 of bridge network 50 via electrical conductors 39. Bridge 50 provides a dc output voltage that is proportional to the temperature sensed by bifilar wire 37. The output of bridge 50 is directed to amplifier network 52 which raises the voltage to a level capable of driving voltage-to-frequency converter 54. The output of voltage-to-frequency converter 54 is square wave with a frequency proportional to ambient temperature and the output of amplifier network 52. However, it is to be understood that the output of amplifier network 52 is not limited to square waves and may be other types of waveforms, such as sine waves or saw tooth waves. The output of voltage-to-frequency converter 54 is propagated to opto-isolator 56 which provides a voltage output having a waveform analogous to the input thereto. Photodiode 144 of opto-isolator 56 receives the square wave modulated output of voltage-to-frequency converter 54 and generates a light signal which is detected by photocell 146. Because photodiode 144 and photocell 146 are not electrically connected, the output of opto-isolator 56, available at nodes 148 and 150, is electrically isolated from the output received from voltage-to-frequency converter 54.

The output of opto-isolator 56 may be propagated via electrical conductors 152 operably coupled between nodes 148 and 150 and receiving transducer 57 located onboard the ship by techniques well known to those skilled in this technology. It is to be understood that the scope of the invention includes other techniques well known by those skilled in this art for transmitting temperature data to a receiving transducer. For example, the output of voltage-to-frequency converter 54 may be propagated to receiving transucer 57 by an acoustic or radio transmitter. Alternatively, the output of voltage-to-frequency converter 54 may be propagated to receiving transducer 57 through optical fibers, as well as by previously described electrical conductors 152.

Whereas amplifier network 52, voltage-to-frequency converter 54, and opto-isolator 56 have been described in the preferred embodiment as being implemented as one or more microchips, it is to be understood that the scope of the present invention comprehends that these systems may be implemented in other forms such as discrete components mounted on a circuit board, since networks which perform each of the functions of these components are well known.

Obviously many modifications and variations of the present invention are possible in light of the above teachings. It is therefore to be understood within the scope of the appended claims the invention may be practiced otherwise than as specifically described.

What is claimed is:

1. A probe for measuring the temperatures of air and water at the air/sea interface, comprising:
   a tubular, electrically nonconductive, solar radiation shield having first and second open ends for permitting said air and water to flow therethrough;
   first means positioned within said shield for detecting said temperatures; and
   second means operably coupled to said first means and mounted to said shield for providing a first output functionally related to said detected temperatures.

2. The probe of claim 1 wherein:
   said first means has an air temperature time constant less than 100 milliseconds.

3. The probe of claim 2 wherein:
   said shield has a surface reflectivity of at least 0.7.

4. The probe of claim 3 wherein:
   said first means comprises:
   an electrically nonconductive open frame positioned within said shield; and
   an electrically conductive winding wound around said frame.

5. A probe for measuring the temperatures of air and water at the air/sea interface, comprising:
   a tubular, electrically nonconductive, solar radiation shield having first and second open ends for permitting said air and water to fluid flow therethrough and having a surface reflectivity of at least 0.7;
   first means positioned within said shield for detecting said temperatures and having an air temperature time constant less than 100 milliseconds, said first means comprising an electrically nonconductive open frame positioned within said shield and a bifilar winding wound around said frame; and
   second means operably coupled to said first means and mounted to said shield for providing a first output functionally related to said detected temperatures.

6. The probe of claim 5 wherein:
   said winding is wound in a plurality of loops around said frame.

7. The probe of claim 6 wherein said second means further includes:
   a voltage divider bridge operably coupled to said bifilar winding for providing second and third outputs, said second and third outputs having a difference functionally related to said detected temperature;
   a differential amplification network operably coupled to said voltage divider bridge for providing a fourth output proportional to said difference between said second and third outputs;
   a voltage-to-frequency converter operably coupled to receive said fourth output for providing a fifth output having a frequency which is proportional to said fourth output; and an opto-isolator operably coupled to receive said fifth output and to provide said first output having said frequency and being electrically isolated from said fifth output.

8. The probe of claim 7 wherein:
said opto-isolator includes:
a photodiode operably coupled to receive said fifth output and to provide an optical signal in response to receiving said second output; and
a photocell positioned to receive said optical signal and to provide said first output.

9. The probe of claim 8 wherein said probe further includes:
a weight mounted to said shield for providing said shield with negative buoyancy.

10. The probe of claim 9 wherein:
said shield has a thermal conductivity of no more than about 0.0035 cal−cm/sec−cm²−C°.

11. A method for detecting an air temperature profile and ocean temperature profile beyond the thermal influence of a moving ship, comprising the steps of:
deploying a temperature transducer mounted within a solar radiation shield beyond said thermal influence of said moving ship, said transducer having an air temperature time constant of less than 100 milliseconds, said solar radiation shield having a thermal conductivity of no more than about 0.0035 cal−cm/sec−cm²−C° and a surface reflectivity of at least 0.7;
detecting said air temperature profile and said ocean temperature profile with said transducer;
providing a plurality of output signals functionally related to said air temperature profile and to said ocean temperature profile;
receiving said detected output signals; and
recording said air temperature profile and said ocean temperature profile.

12. The method of claim 11 wherein the steps of providing and receiving include:
propagating said output signals to a receiving transducer.

13. The method of claim 12 wherein the step of deploying includes:
launching said transducer at a substantially 45 degree angle with respect to the horizontal into a parabolic trajectory.

14. The method of claim 13 wherein the step of deploying further includes:
deploying said transducer within said solar radiation shield wherein said shield is tubular having open ends.

15. A probe for measuring air and water temperature, comprising:
a tubular, electrically nonconductive, solar radiation shield having first and second open ends for permitting fluid flow therethrough upon deployment of said probe, said shield having a surface reflectivity of at least 0.7 and a thermal conductivity of no ore than 0.0035 cal−cm/sec−cm²−C°; and
first means for detecting temperature being positioned within said shield to permit total immersion of said first means within said fluid flow.

16. The probe of claim 15 wherein:
said first means has an air temperature time constant of less than 100 milliseconds.

17. The probe of claim 16 wherein:
said first means comprises:
an electrically nonconductive open frame; and
an electrically conductive winding wound around said frame.

18. A probe for measuring the temperatures of air and water at the air/sea interface, comprising:
a tubular, electrically nonconductive, solar radiation shield having first and second open ends for permitting said air and water to flow therethrough and having a surface reflectivity of at least 0.7; first means positioned within said shield for detecting said temperatures and having an air temperature time constant less than 100 milliseconds, said first means comprising an electrically nonconductive open frame positioned within said shield and wound around said frame.

19. The probe of claim 18 wherein: said winding is wound in a plurality of loops around said frame.

20. The probe of claim 19 wherein said probe further includes:
a weight mounted to said shield for providing said shield with negative buoyancy.

21. A probe for measuring fluid temperature, comprising:
a tubular, electrically nonconductive, solar radiation shield having first and second open ends for permitting fluid to flow therethrough, said shield having a surface reflectivity of at least 0.7 and a thermal conductivity of no more than 0.0035 cal−cm/sec−cm²−C°;
first means for detecting said fluid temperature being positioned within said shield to permit total immersion of said first means within said fluid; and
second means mounted to said shield, said second means being operably coupled to said first means for providing a first output functionally related to said detected fluid temperature.

22. The probe of claim 21 wherein:
said first means has an air temperature time constant less than 100 milliseconds.

23. The probe of claim 22 wherein:
said first means comprises:
an electrically nonconductive open frame positioned within said shield; and
an electrically conductive winding wound around said frame.

24. A probe for measuring fluid temperature, comprising:
a tubular, electrically nonconductive, solar radiation shield having first and second open ends for permitting said fluid to flow therethrough and having a surface reflectivity of at least 0.7;
first means positioned within said shield for detecting said fluid temperature and having an air temperature time constant less than 100 milliseconds, said first means comprising an electrically nonconductive open frame positioned within said shield and a bifilar winding wound around said frame.

25. The probe of claim 24 wherein:
said winding is wound in a plurality of loops around said frame.

26. The probe of claim 25 wherein said second means further includes:
a voltage divider bridge operably coupled to said bifilar winding for providing second and third outputs, said second and third outputs having a difference functionally related to said detected temperature;
a differential amplification network operably coupled to said voltage divider bridge for providing a fourth output proportional to said difference between said second and third outputs;

a voltage-to-frequency converter operably coupled to receive said fourth output for providing a fifth output having a frequency which is proportional to said fourth output; and an opto-isolator operably coupled to receive said fifth output and to provide said first output having said frequency and being electrically isolated from said fifth output.

27. The probe of claim 26 wherein:

said opto-isolator network includes:

a photodiode operably coupled to receive said fifth output and to provide an optical signal in response to receiving said second output; and a photocell positioned to receive said optical signal and to provide said first output.

28. The probe of claim 27 wherein said probe further includes:

a weight mounted to said shield for providing said shield with negative buoyancy.

29. A probe for measuring temperature, comprising;

a tubular, electrically nonconductive, solar radiation shield having first and second open ends for permitting fluid flow therethrough upon deployment of said probe;

a temperature transducer for detecting fluid temperature positioned within said shield to permit total immersion of said temperature transducer within said fluid flow, said temperature transducer having an air temperature time constant less than 100 milliseconds; and second means mounted to said shield, said second means being operably coupled to said temperature transducer for providing a first output functionally related to said detected temperature.

30. The probe of claim 29 wherein:

said shield has a surface reflectivity of at least 0.7.

31. The probe of claim 30 wherein:

said temperature transducer comprises:

an electrically nonconductive open frame positioned within said shield; and an electrically conductive winding wound around said frame.

32. The probe of claim 31 wherein:

said winding is a bifilar winding.

33. The probe of claim 32 wherein:

said winding is wound in a plurality of loops around said frame.

34. The probe of claim 33 wherein said second means further includes:

a voltage divider bridge operably coupled to said bifilar winding for providing second and third outputs, said second and third outputs having a difference functionally related to said detected temperature;

a differential amplification network operably coupled to said voltage divider bridge for providing a fourth output proportional to said difference between said second and third outputs;

a voltage-to-frequency converter operably coupled to receive said fourth output for providing a fifth output having a frequency which is proportional to said fourth output; and an opto-isolator operably coupled to receive said fifth output and to provide said first output having said frequency and being electrically isolated from said fifth output.

35. The probe of claim 34 wherein:

said opto-isolator includes:

a photodiode operably coupled to receive said fifth output and to provide an optical signal in response to receiving said second output; and a photocell positioned to receive said optical signal and to provide said first output.

36. The probe of claim 35 wherein said probe further includes:

a weight mounted to said shield for providing said shield with negative buoyancy.

37. The probe of claim 36 wherein:

said shield has a thermal conductivity of no more than about $0.0035 \text{ cal} - \text{cm/sec} - \text{cm}^2 - \text{C}°$.

* * * * *